(12) United States Patent
Chen (10) Patent No.: US 9,483,543 B2
(45) Date of Patent: Nov. 1, 2016

(54) DATA COLLECTING METHOD AND APPARATUS, AND MOBILE TERMINAL

(71) Applicant: Huawei Device Co., Ltd., Shenzhen (CN)

(72) Inventor: Lei Chen, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 181 days.

(21) Appl. No.: 14/464,936

(22) Filed: Aug. 21, 2014

(65) Prior Publication Data

US 2014/0365434 A1    Dec. 11, 2014

Related U.S. Application Data

(63) Continuation of application No. PCT/CN2013/071630, filed on Feb. 18, 2013.

(30) Foreign Application Priority Data

Feb. 24, 2012  (CN) .......................... 2012 1 0044164

(51) Int. Cl.
  *G06F 11/20* (2006.01)
  *G06F 17/30* (2006.01)
  *G01D 5/244* (2006.01)
  *G01D 9/00* (2006.01)

(52) U.S. Cl.
  CPC ..... *G06F 17/30581* (2013.01); *G01D 5/24457* (2013.01); *G01D 9/005* (2013.01); *G06F 11/2071* (2013.01); *G06F 17/30008* (2013.01)

(58) Field of Classification Search
  CPC .......................... G06F 11/2071; G06F 17/3008
  See application file for complete search history.

(56) References Cited

U.S. PATENT DOCUMENTS 6,693,511 B1 *   2/2004   Seal .......................... G01S 5/10
                                                                340/10.1
7,020,701 B1 *   3/2006   Gelvin .................. G01D 21/00
                                                                250/332

(Continued)

FOREIGN PATENT DOCUMENTS

CN         1909499 A      2/2007
CN       101320337 A     12/2008

(Continued)

OTHER PUBLICATIONS

Partial English Translation and Abstract of Chinese Patent Application No. CN102607645A, Sep. 4, 2014, 6 pages.

(Continued)

*Primary Examiner* — Rehana Perveen
*Assistant Examiner* — Raheem Hoffler
(74) *Attorney, Agent, or Firm* — Conley Rose, P.C.; Grant Rodolph; William H. Dietrich (57) ABSTRACT

A data collecting method and apparatus, and a mobile terminal are provided. The data collecting method may be applied in an apparatus including multiple data collecting units. The method includes collecting, by at least two data collecting units, initial data simultaneously at their respective collecting frequencies and at a collection starting moment and collecting, at a synchronous collecting frequency, the initial data collected by the at least two data collecting units so as to obtain synchronous data. The synchronous collecting frequency is a common divisor frequency of the respective collecting frequencies of the at least two data collecting units.

9 Claims, 3 Drawing Sheets

(56) References Cited

U.S. PATENT DOCUMENTS

| | | | |
|---|---|---|---|
| 8,359,378 B2 | 1/2013 | Kudo | |
| 2002/0156819 A1 | 10/2002 | Oerlemans | |
| 2009/0089558 A1* | 4/2009 | Bradford | G05B 21/02 712/225 |
| 2009/0184849 A1* | 7/2009 | Nasiri | G06F 3/0346 341/20 |
| 2010/0057474 A1* | 3/2010 | Kong | G10L 21/00 704/500 |
| 2012/0290266 A1* | 11/2012 | Jain | G06F 19/3406 702/187 |
| 2013/0102268 A1* | 4/2013 | Wang | G01S 19/34 455/343.2 |

FOREIGN PATENT DOCUMENTS

| | | |
|---|---|---|
| CN | 102098153 A | 6/2011 |
| CN | 102274028 A | 12/2011 |
| CN | 102607645 A | 7/2012 |
| JP | 04223798 A | 8/1992 |
| JP | 20030242130 A | 8/2003 |
| JP | 2011183088 A | 9/2011 |

OTHER PUBLICATIONS

Foreign Communication From a Counterpart Application, PCT Application No. PCT/CN2013/071630, English Translation of International Search Report dated May 23, 2013, 2 pages.

Foreign Communication From a Counterpart Application, PCT Application No. PCT/CN2013/071630, English Translation of Written Opinion dated May 23, 2013, 6 pages.

Foreign Communication From a Counterpart Application, Chinese Application No. 201210044164.5, Chinese Office Action dated Feb. 8, 2014, 5 pages.

Foreign Communication From a Counterpart Application, European Application No. 13752100.1 Extended European Search Report dated Feb. 20, 2015, 6 pages.

Partial English Translation and Abstract of Japanese Patent Application No. JPA2011183088, Oct. 15, 2015, 38 pages.

Foreign Communication From a Counterpart Application, Chinese Application No. 2014557984, Chinese Office Action dated Aug. 11, 2015, 3 pages.

Foreign Communication From a Counterpart Application, Chinese Application No. 2014557984, English Translation of Chinese Office Action dated Aug. 11, 2015, 4 pages.

* cited by examiner

DATA COLLECTING METHOD AND APPARATUS, AND MOBILE TERMINAL

CROSS-REFERENCE TO RELATED APPLICATIONS

This application is a continuation of International Application No. PCT/CN2013/071630, filed on Feb. 18, 2013, which claims priority to Chinese Patent Application No. 201210044164.5, filed on Feb. 24, 2012, both of which are hereby incorporated by reference in their entireties.

TECHNICAL FIELD

The present invention relates to the communications field, and in particular, to a data collecting method and apparatus, and a mobile terminal that are applicable to an apparatus including multiple data collecting units.

BACKGROUND

Among known mobile terminals, one mobile terminal generally uses multiple different data collecting units, such as sensors, to acquire various external environmental data, thereby ensuring that an application running on the mobile terminal is capable of using the environmental data to implement certain functions. A smartphone, for example, generally includes a gravitational acceleration sensor used to collect gravitational acceleration data so as to implement such functions as switching a mobile phone screen between landscape and portrait orientations and flipping a mobile phone body to silence it when a call comes. The smartphone may further include an electronic compass sensor used to collect direction data so as to implement functions of a compass and the like and may further include an infrared sensor used to sense information about face distance so as to implement such functions as automatically closing a screen and a touchscreen during a call.

For an application implementing a certain function, data collected by multiple sensors may need to be used simultaneously to collaboratively implement a corresponding function. For example, an application that implements a function of closing screen display and a touchscreen when a user is making a call to avoid occurrence of an accidental touch when a face touches the touchscreen, requires not only data of the information about the face distance collected by the infrared sensor but also the gravitational acceleration data collected by the gravitational acceleration sensor. That is, the function of closing the screen display and the touchscreen is triggered only when the data of the information about the face distance collected by the infrared sensor represents that the face of a user approaches the screen, and at the same time, the gravitational acceleration data collected by the gravitational acceleration sensor represents that the mobile phone is in a portrait orientation.

In order to meet the requirements of such type of applications for data collected by multiple sensors, there is a data collecting method in the prior art. The method mainly includes collecting, by each sensor, data according to a respective collecting frequency and then determining, by each sensor, whether a difference between data collected this time and data collected for the previous time is greater than a predetermined threshold. If the difference is greater than the predetermined threshold, the data collected this time is reported to an intermediate layer. The intermediate layer selects from the data reported by each sensor one or more groups of data at a same moment or close moments and provides the one or more groups of data for the applications to use.

However, when an application requires, at a certain moment, data collected by multiple sensors, real-time and accurate data collected by each sensor at the certain moment may not be timely obtained if the foregoing data collecting method is used. Rather, data of each sensor at a moment close to the certain moment is obtained. Such data cannot meet requirements of some applications that have a relatively high requirement on data precision. For example, an application used to determine a posture and a motion track of a mobile phone needs to acquire data of the gravitational acceleration sensor, the electronic compass sensor, and a gyroscope sensor at the same time so as to calculate information about the posture, a position, a moving speed, and the like of the mobile phone. If a data collecting time point of the three sensors is not precisely at the same moment, an error may be caused in a calculation of this application.

SUMMARY

In order to precisely collect multiple groups of synchronous data of at least two data collecting units at a same moment, embodiments of the present invention provide a data collecting method and apparatus, and a mobile terminal.

According to one aspect, an embodiment of the present invention provides a data collecting method, applied in an apparatus including multiple data collecting units, where the method includes collecting, by at least two data collecting units, initial data simultaneously at their respective collecting frequencies and at a collection starting moment and collecting, at a synchronous collecting frequency, the initial data collected by the at least two data collecting units so as to obtain synchronous data. The synchronous collecting frequency is a common divisor frequency of the respective collecting frequencies of the at least two data collecting units.

According to another aspect, an embodiment of the present invention provides a data collecting apparatus, applied in an apparatus including multiple data collecting units, where the data collecting apparatus includes a synchronous data collecting module where at least two data collecting units in the multiple data collecting units are configured to collect initial data simultaneously at their respective collecting frequencies and at a collection starting moment. The synchronous data collecting module is configured to collect, at a synchronous collecting frequency, the initial data collected by the at least two data collecting units so as to obtain synchronous data. The synchronous collecting frequency is a common divisor frequency of the respective collecting frequencies of the at least two data collecting units.

According to still another aspect, an embodiment of the present invention further provides a mobile terminal including multiple data collecting units, the mobile terminal further includes a data collecting apparatus, and the data collecting apparatus includes a synchronous data collecting module where at least two data collecting units in the multiple data collecting units are configured to collect initial data simultaneously at their respective collecting frequencies and at a collection starting moment and the synchronous data collecting module is configured to collect, at a synchronous collecting frequency, the initial data collected by the at least two data collecting units so as to obtain synchronous data. The synchronous collecting frequency is a common divisor frequency of the respective collecting frequencies of the at least two data collecting units.

According to still another aspect, an embodiment of the present invention provides a mobile terminal including multiple data collecting units and one or more processors. At least two data collecting units in the multiple data collecting units are configured to collect initial data simultaneously at their respective collecting frequencies and at a collection starting moment. The one or more processors are configured to collect, at a synchronous collecting frequency, the initial data collected by the at least two data collecting units so as to obtain synchronous data. The synchronous collecting frequency is a common divisor frequency of the respective collecting frequencies of the at least two data collecting units.

It can be known from the foregoing technical solutions that multiple groups of synchronous data of each data collecting unit are obtained in a manner of adjusting collection starting moments of at least two data collecting units and at the same time capturing, according to a synchronous collecting frequency, synchronous data from initial data collected by the at least two data collecting units; and each group of synchronous data is accurate data collected at a same moment by each data collecting unit, so that an application using the multiple groups of synchronous data can avoid occurrence of an error.

BRIEF DESCRIPTION OF DRAWINGS

To describe the technical solutions in the embodiments of the present invention more clearly, the following briefly introduces the accompanying drawings required for describing the embodiments. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Embodiment 1

Figure 1:
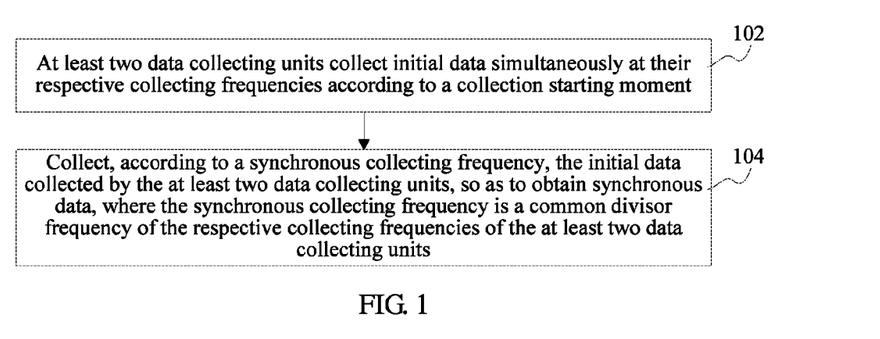
FIG. 1 is a method flowchart of a data collecting method according to Embodiment 1 of the present invention.

Referring to FIG. 1, a method flowchart of a data collecting method according to Embodiment 1 of the present invention is shown. The data collecting method may be applied in an apparatus including multiple data collecting units. The apparatus may be a fixed terminal such as a personal computer and a server and may further be a mobile terminal such as a notebook, a tablet, and a mobile phone. The data collecting method includes the following steps.

Step 102: At least two data collecting units collect initial data simultaneously at their respective collecting frequencies according to a collection starting moment.

The data collecting units in this specification mainly refer to various sensors. In one or more other embodiments, the data collecting units may further refer to other modules collecting data at certain collecting frequencies. In this embodiment, an example that the data collecting units are sensors is mainly used for detailed description, which does not constitute a limitation thereto.

Sometimes an application may simultaneously need data collected by multiple sensors at a same moment. The multiple sensors may be all sensors in a terminal or may be a part of the sensors in a terminal. The part of the sensors may be two, three, or even more sensors. To collect data collected by the at least two sensors at a same moment, certain data collecting moments of the at least two sensors are set as a same moment. Generally, moments at which the at least two sensors collect data for the first time are set as the same moment. That is, a collection starting moment may be set, and then the at least two data collecting units may simultaneously start to collect initial data at their respective collecting frequencies according to the collection starting moment.

Step 104: Collect, according to a synchronous collecting frequency, the initial data collected by the at least two data collecting units so as to obtain synchronous data. The synchronous collecting frequency is a common divisor frequency of the respective collecting frequencies of the at least two data collecting units.

After the collection starting moment, initial data collected by each sensor may be collected according to the synchronous collecting frequency. The synchronous collecting frequency herein may be a common divisor frequency of the respective collecting frequencies of sensors. For example, if a collecting frequency of a sensor is 100 hertz (Hz), a collecting frequency of another sensor is 200 Hz, and a collecting frequency of still another sensor is 50 Hz, any one of 50 Hz, 25 Hz, 5 Hz, and 2 Hz may be used as the synchronous collecting frequency. Data collected in this case is synchronous data, and data of each sensor in each group of synchronous data is real-time and precise data at a same moment. The synchronous data may be provided for an application to use. As for selecting which common divisor as a value of the common divisor frequency, a person of ordinary skill in the art may make reasonable selection according to a situation, and details are not described herein again. Preferably, a common divisor of a relatively large value may be selected as the value of the common divisor frequency.

In conclusion, according to the data collecting method provided in Embodiment 1, multiple groups of synchronous data of each data collecting unit are obtained in a manner of adjusting collection starting moments of at least two data collecting units and at the same time capturing, according to a synchronous collecting frequency, synchronous data from initial data collected by the at least two data collecting units. Each group of synchronous data is accurate data of each data collecting unit at a same moment so that an application using the multiple groups of synchronous data can avoid occurrence of an error.

Embodiment 2

Figure 2:
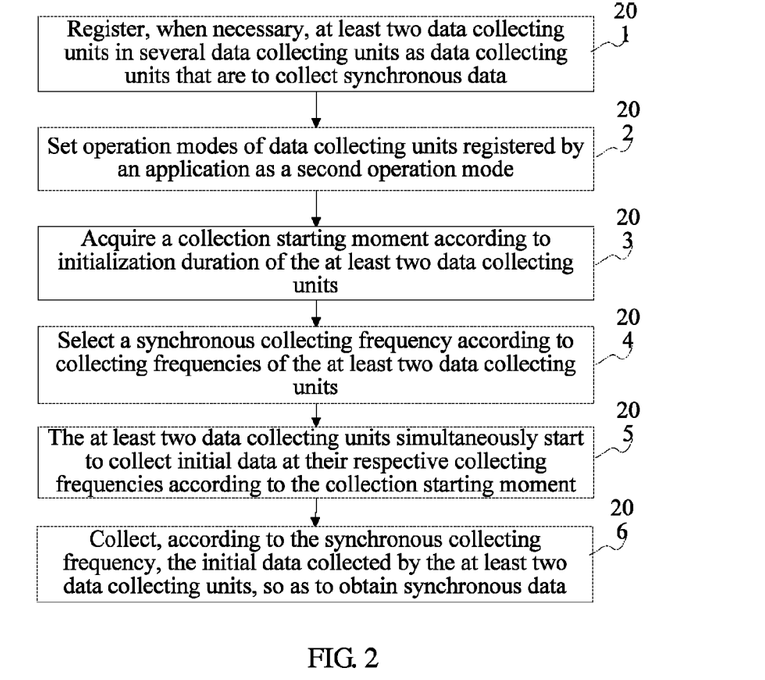
FIG. 2 is a method flowchart of a data collecting method according to Embodiment 2 of the present invention.

Referring to FIG. 2, a method flowchart of a data collecting method according to Embodiment 2 of the present invention is shown. The data collecting method may be applied in an apparatus including multiple data collecting units. The apparatus may be a fixed terminal such as a personal computer and a server and may further be a mobile terminal such as a notebook, a tablet, and a mobile phone. The data collecting method includes the following steps:

Step 201: Register, when necessary, at least two data collecting units in multiple data collecting units as data collecting units that are to collect synchronous data.

An example that the data collecting units are sensors is still used. A terminal may include multiple sensors and an application may require, at a certain moment, precise data of only a part of the multiple sensors at a same moment. Therefore the application, when desired, may first register all or a part of sensors as data collecting units that are to collect synchronous data. In other words, the registered data collecting units that are to collect synchronous data are sensors related to acquiring of synchronous data required by the application. The application may not register one or more other sensors in the terminal. For example, the application is a game. When a user runs the game, a gyroscope sensor, a gravitational acceleration sensor, and an infrared sensor in the terminal may be registered as the data collecting units that are to collect synchronous data.

Step 202: Set an operation mode of the data collecting units registered by the application as a second operation mode.

A sensor generally has two operation modes: a first operation mode and the second operation mode. The first operation mode is as follows. The sensor determines whether a difference between data collected this time and data collected for the previous time is greater than a predetermined threshold. If the difference is greater than the predetermined threshold, the data collected this time is reported as initial data. Otherwise, the data collected this time is not reported. The second operation mode is as follows. Data collected each time by the sensor is reported as the initial data. Generally, the first operation mode is used by default in all sensors in the terminal so as to reduce CPU workloads. However, in this embodiment, after the application registers a part of sensors, operation modes of the part of sensors registered by the application need to be set as the second operation mode so as to acquire accurate data. That is, the operation modes of the registered sensors are set as an operation mode in which precise data collected each time is reported as the initial data.

Step 203: Acquire a collection starting moment according to initialization duration of the at least two data collecting units.

To collect data collected at a same moment by at least two sensors registered by the application, first certain data collecting moments of the at least two sensors are set as a same moment. Generally, herein moments at which the at least two sensors collect data for the first time are set as the same moment. That is, a same collection starting moment may be set for the registered sensors so that these sensors simultaneously start to collect the initial data. This specifically is as follows. First, initialization duration of all sensors and the maximum initialization duration in the initialization duration are acquired. The initialization duration refers to a period of time from which the sensors are powered on and start to be initialized and to which the sensors complete initialization and perform data collecting for the first time. For different sensors, the initialization duration may be different from each other. Second, after the initialization duration of all sensors is obtained, a certain moment in the future may be used as the collection starting moment. Generally this moment is not smaller than a moment obtained after the maximum initialization duration acquired in the first step is prolonged backwards based on a current moment. That is, the collection starting moment may be a moment (the current moment+the maximum initialization duration) or a moment after (the current moment+the maximum initialization duration). For example, if initialization duration of a sensor is 190 milliseconds (ms), and initialization duration of another sensor is 120 ms, a moment (the current moment+190 ms) or a moment (the current moment+200 ms) may be used as the collection starting moment. In a specific embodiment, there may be a predetermined duration, and the predetermined duration is a fixed value greater than or equal to 0. Then, after acquiring the maximum initialization duration, the terminal may automatically use a moment indicated by (the current moment+the maximum initialization duration+the predetermined duration) as the collection starting moment.

Step 204: Select a synchronous collecting frequency according to collecting frequencies of the at least two data collecting units.

The at least two data collecting units herein may refer to the sensors registered by the application in step 201. To select the synchronous collecting frequency, collecting frequencies of these registered sensors are acquired. In some embodiments, a demanded frequency of the synchronous data is acquired.

The collecting frequency is a frequency at which the sensor collects the initial data in the second operation mode. It should be noted that each sensor may have more than one collecting frequency, and in this case all collecting frequencies of the sensor may be acquired. The collecting frequency herein may refer to an actual collecting frequency of the sensor or may refer to a frequency at which the sensor reports the initial data.

The demanded frequency of the synchronous data is a frequency suitable when the synchronous data is used by other modules. The frequency may be specified by the other modules before collecting the synchronous data. For convenience of description, these modules are called synchronous data using modules in this specification, and generally the synchronous data using modules are applications. Specifically, when only one application needs to use the synchronous data, the demanded frequency is a lowest frequency suitable when the application uses the synchronous data. When several applications need to use the synchronous data, lowest frequencies suitable when all applications need to use the synchronous data may first be acquired, and then a value of the least common multiple of all lowest frequencies is used as a value of the demanded frequency. For example, if an application needs to use the synchronous data at a lowest frequency of 5 Hz, another application needs to use the synchronous data at a lowest frequency of 10 Hz, and still another application needs to use the synchronous data at a lowest frequency of 50 Hz, the frequency of 50 Hz may be used as the demanded frequency.

After the collecting frequencies of all sensors are acquired, all common divisors of values of the collecting frequencies of all sensors may be acquired. For example, if a collecting frequency of a sensor is 400 Hz, a collecting frequency of another sensor is 200 Hz, and a collecting frequency of still another sensor is 100 Hz, common divisors of values of the collecting frequencies of these sensors are 100, 50, 25, 5, 2, 1, and the like. Then, any one of all common divisors may be selected as a value of the synchronous collecting frequency.

In a preferable solution, when one of all the common divisors is selected as the value of the synchronous collecting frequency, the demanded frequency of the synchronous data may be combined and referenced so as to make better selection. That is, the minimum common divisor of a common divisor in all the common divisors and not smaller than the value of the demanded frequency is selected as the value of the synchronous collecting frequency. Specifically, a common divisor greater than or equal to the demanded frequency may be filtered from all the common divisors, and then the minimum one of the filtered common divisor is selected as the value of the synchronous collecting frequency. For example, if the demanded frequency of the synchronous data is 50 Hz, and filtered common divisors are 100 and 50, the smaller frequency of 50 Hz may be selected as the value of the synchronous collecting frequency.

Step 205: The at least two data collecting units simultaneously start to collect initial data at their respective collecting frequencies according to the collection starting moment.

The at least two sensors registered by the application may simultaneously start to collect the initial data at their respective collecting frequencies according to the collection starting moment acquired in step 203. This is as follows. First, after the collection starting moment is acquired, initialization moments of the at least two sensors registered by the application may be acquired according to the collection starting moment. The acquired initialization moments may be moments obtained after their respective initialization duration of the sensors is advanced based on the collection starting moment. That is, the initialization moment of each sensor may be acquired as (the collection starting moment−initialization duration corresponding to the sensor). For example, when the collection starting moment is (the current moment+200 ms), an initialization moment of a sensor whose initialization duration is 190 ms may be acquired as (the current moment+200 ms−190 ms)=(the current moment+10 ms). An initialization moment of a sensor whose initialization duration is 120 ms may further be acquired as (the current moment+200 ms−120 ms)=(the current moment+80 ms). Second, the at least two sensors registered by the application are initialized according to the initialization moments. After simultaneously completing initialization processes at the collection starting moment, the at least two sensors registered by the application automatically collect the initial data at their respective collecting frequencies. For example, a corresponding timer may be enabled according to the initialization moment of each sensor so as to start to initialize the first sensor at (the current moment+ 10 ms) and start to initialize the second sensor at (the current moment+80 ms). Finally, both sensors complete the initialization processes at the collection starting moment and start data collecting for the first time. It should be noted that because generally the sensors are running when the terminal is switched on, generally the initialization herein is a process of reinitializing related sensors that are running.

It should further be noted that one or more other manners may be used to enable each sensor to start to collect the initial data at their respective collecting frequencies at the collection starting moment. For example, where there are three sensors, the first sensor keeps running all the time, initialization duration of the second sensor is 190 ms, and the initialization duration of the third sensor is 120 ms. To enable the three sensors to simultaneously start to collect data at a collection starting moment, a data collecting moment T in a data collecting process of the first sensor may be used as the collection starting moment. Then, a corresponding timer may be enabled to initialize the second sensor in advance at a moment (T−190 ms) and initialize the third sensor at a moment (T−120 ms). In this way, at the T moment, the three sensors will simultaneously start to collect initial data at their respective frequencies.

Step 206: Collect, according to the synchronous collecting frequency, the initial data collected by the at least two data collecting units so as to obtain the synchronous data.

After the collection starting moment, the initial data collected by each sensor may be collected according to the synchronous collecting frequency selected in step 204 so as to obtain the synchronous data. The synchronous data may be provided for the application to use. Certainly, corresponding to step 201 to step 202, when the application does not need the synchronous data, the registered sensors may be released. The released sensors may change from the second operation mode to the first operation mode and the like.

In conclusion, according to the data collecting method provided in Embodiment 2, multiple groups of synchronous data of each data collecting unit are obtained in a manner of adjusting collection starting moments of at least two data collecting units and at the same time capturing, according to a synchronous collecting frequency, synchronous data from initial data collected by the at least two data collecting units. Each group of synchronous data is accurate data of each data collecting unit at a same moment so that an application using the multiple groups of synchronous data can avoid occurrence of an error.

Embodiment 3

Figure 3:
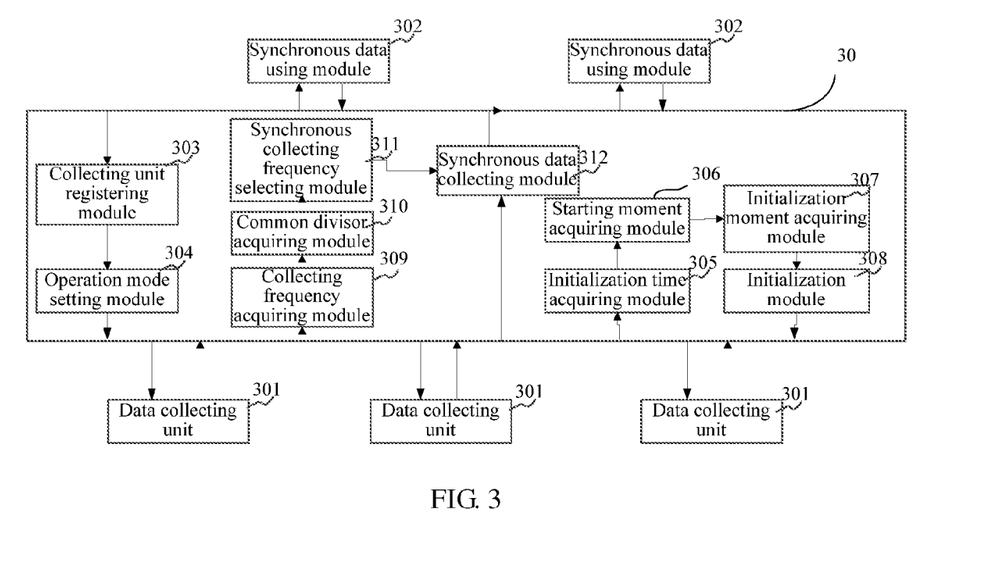
FIG. 3 is a structural block diagram of a data collecting apparatus according to Embodiment 3 of the present invention.

Referring to FIG. 3, a structural block diagram of a data collecting apparatus according to Embodiment 3 of the present invention is shown. The data collecting apparatus 30 may be applied in an apparatus including multiple data collecting units 301. For example, the apparatus may be a fixed terminal such as a personal computer and a server a mobile terminal such as a notebook, a tablet, and a mobile phone. Generally, the mobile terminal further includes multiple synchronous data using modules 302. The data collecting apparatus 30 may include a collecting unit registering module 303, an operation mode setting module 304, an initialization time acquiring module 305, a starting moment acquiring module 306, an initialization moment acquiring module 307, an initialization module 308, a collecting frequency acquiring module 309, a common divisor acquiring module 310, a synchronous collecting frequency selecting module 311, and a synchronous data collecting module 312.

The data collecting units 301 are configured to collect initial data according to a particular collecting frequency. The data collecting units 301 may be various sensors in the mobile terminal, and the collecting frequency herein may refer to an actual collecting frequency of a sensor or may refer to a frequency at which a sensor reports the initial data. The data collecting units 301 generally have two operation modes: a first operation mode in which whether a difference between data collected this time and data collected for the previous time is greater than a predetermined threshold is determined, where if the difference between the data collected this time and the data collected for the previous time is greater than the predetermined threshold, the data collected this time is reported as the initial data; and a second operation mode in which data collected each time is reported as the initial data. In addition, generally, the data collecting units 301 run in the first operation mode.

The synchronous data using modules 302 are configured to use or process data collected at a same moment by each data collecting unit 301, where the data collected at a same moment by each data collecting unit 301 is synchronous data. The synchronous data using modules 302 may be applications. The synchronous data is provided by the synchronous data collecting module 312.

The collecting unit registering module 303 is configured to, when the synchronous data using modules 302 require the synchronous data, register all or a part of the data collecting units 301 as data collecting units 301 that are to collect synchronous data. A terminal may include multiple data collecting units 301, and the synchronous data using modules 302 may require precise data at a same moment of only a part of the data collecting units 301. Therefore, the synchronous data using modules 302 may register, by using the collecting unit registering module 303, all or a part of the data collecting units 301 as the data collecting units that are to collect synchronous data. The data collecting units that are to collect synchronous data are related data collecting units when the synchronous data using modules 302 need to acquire the synchronous data. The synchronous data using modules 302 may not register one or more other data collecting units in the terminal.

The operation mode setting module 304 is configured to set an operation mode of each data collecting unit 301 registered by the collecting unit registering module 303 as the second operation mode from the default first operation mode. The second operation mode refers to an operation mode in which the data collecting units 301 report data collected each time as the initial data.

The initialization time acquiring module 305 is configured to acquire initialization duration of at least two data collecting units 301 registered by the collecting unit registering module 303 and the maximum initialization duration in the initialization duration. The initialization duration refers to a period of time from which a sensor is powered on and starts to be initialized and to which the sensor completes initialization and performs data collecting for the first time. For different data collecting units 301, the initialization duration may be different from each other.

The starting moment acquiring module 306 is configured to acquire a collection starting moment, and the collection starting moment is not smaller than a moment obtained after the maximum initialization duration is prolonged backwards based on a current moment.

The initialization moment acquiring module 307 is configured to collect initialization moments of the at least two data collecting units 301 registered by the collecting unit registering module 303. The initialization moments of the at least two data collecting units 301 registered by the collecting unit registering module 303 may be moments obtained after respective initialization duration of the data collecting units 301 is advanced based on the collection starting moment acquired by the starting moment acquiring module 306.

The initialization module 308 is configured to initialize, according to the initialization moments acquired by the initialization moment acquiring module 307, the at least two data collecting units 301 registered by the collecting unit registering module 303. After simultaneously completing initialization processes at the collection starting moment acquired by the starting time acquiring module 306, the at least two data collecting units 301 registered by the collecting unit registering module 303 collect the initial data at their respective collecting frequencies.

The collecting frequency acquiring module 309 is configured to acquire collecting frequencies of the at least two data collecting units 301 registered by the collecting unit registering module 303. The collecting frequencies are frequencies at which the data collecting units 301 collect the initial data in the second operation mode. It should be noted that each sensor may have more than one collecting frequency, and in this case all collecting frequencies of the sensor may be acquired. The collecting frequency herein may refer to an actual collecting frequency of the sensor or may refer to a frequency at which the sensor reports the initial data.

The common divisor acquiring module 310 is configured to acquire all common divisors of values of the collecting frequencies, which are acquired by the collecting frequency acquiring module 309, of the at least two data collecting units 301.

Figure 4:
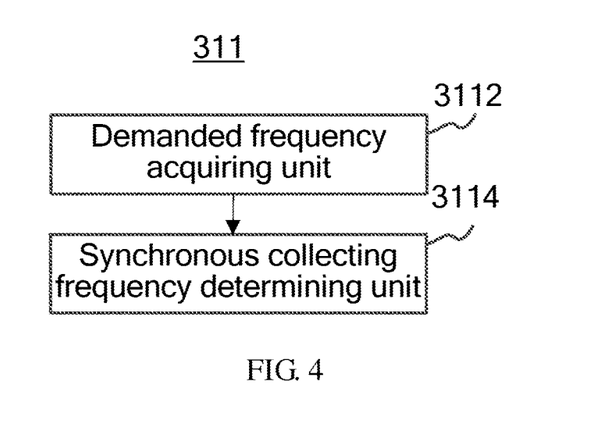
FIG. 4 is a structural block diagram of a synchronous collecting frequency selecting module according to Embodiment 3 of the present invention.

The synchronous collecting frequency selecting module 311 is configured to select one from all the common divisors acquired by the common divisor acquiring module 310 as a value of a synchronous collecting frequency. In a specific embodiment, the synchronous collecting frequency selecting module 311 may further specifically include, as shown in FIG. 4, a demanded frequency acquiring unit 3112 and a synchronous collecting frequency determining unit 3114. The demanded frequency acquiring unit 3112 is configured to acquire a demanded frequency of the synchronous data, and the demanded frequency is a frequency required when the synchronous data using module 302 uses the synchronous data; and the synchronous collecting frequency determining unit 3114 is configured to select the minimum common divisor of a common divisor, which is in the common divisors acquired by the common divisor acquiring module 310 and is not smaller than a value of the demanded frequency acquired by the demanded frequency acquiring unit 3112, as the value of the synchronous collecting frequency.

Multiple synchronous data using modules 302 may simultaneously need to use the synchronous data, and therefore the demanded frequency acquiring unit 3112 may further specifically include a lowest frequency acquiring subunit and a demanded frequency selecting subunit (not shown specifically). The lowest frequency acquiring subunit is configured to acquire lowest frequencies required when synchronous data using modules 302 use the synchronous data. The demanded frequency selecting subunit is configured to select the least common multiple of values of the lowest frequencies acquired by the lowest frequency acquiring subunit as a value of the demanded frequency.

The synchronous data collecting module 312 is configured to collect, according to the synchronous collecting frequency selected by the synchronous collecting frequency selecting unit 311, the initial data collected by each data collecting unit 301 so as to obtain the synchronous data.

In a specific embodiment, the data collecting apparatus may be a smartphone. The smartphone includes a gyroscope sensor, a gravitational acceleration sensor, an infrared sensor, and an electronic compass sensor. These four sensors may be four data collecting units 301. A racing game running in the smartphone may be a synchronous data using module 302. After a user triggers the racing game to run, this racing game may register, by using the collecting unit registering module 303, the gyroscope sensor and the gravitational acceleration sensor as at least two data collecting units 301 that are to collect synchronous data. Then, the operation mode setting module 304 sets, from the default first operation mode, operation modes of the gyroscope sensor and the gravitational acceleration sensor as the second operation mode in which the data collected each time is reported as the initial data. The initialization time acquiring module 305 may acquire that initialization duration of the gyroscope sensor is 190 ms, and initialization duration of the gravitational acceleration sensor is 120 ms, of which the maximum initialization duration is 190 ms. It is assumed that predetermined duration is 100 ms, the starting moment acquiring module 306 may use a moment indicated by (the current moment+190 ms+100 ms) as the collection starting moment; and the initialization moment acquiring module 307 may use a moment indicated by (the current moment+190 ms+100 ms−190 ms)=(the current moment+100 ms) as an initialization moment of re-initialization of the gyroscope sensor, and at the same time may use a moment indicated by (the current moment+190 ms+100 ms−120 ms)=(the current moment+170 ms) as an initialization moment of re-initialization of the gravitational acceleration sensor. The initialization module 308 starts a corresponding timer to enable the gyroscope sensor to perform the re-initialization at the moment indicated by (the current moment+100 ms) and to enable the gravitational acceleration sensor to perform re-initialization at the moment indicated by (the current moment+170 ms). Both the gyroscope sensor and the gravitational acceleration sensor will simultaneously complete the initialization at the collection starting moment and start to collect the initial data at their respective frequencies.

In another aspect, after the gyroscope sensor and the gravitational acceleration sensor are registered, the collecting frequency acquiring module 309 may acquire that a collecting frequency of the gyroscope sensor is 100 Hz and a collecting frequency of the gravitational acceleration sensor is 200 Hz. Values of common divisor frequencies obtained by the common divisor acquiring module 310 may be 1, 2, 4, 5, 10, 20, 25, 50, and 100. The demanded frequency acquiring unit 3112 in the synchronous collecting frequency selecting module 311 acquires that the racing game needs to use the synchronous data at a lowest frequency of 25 Hz. Then, the synchronous collecting frequency determining unit 3114 in the synchronous collecting frequency selecting module 311 selects 25 Hz as the synchronous collecting frequency. After the collection starting moment, the synchronous data collecting module 312 may collect, by using the synchronous collecting frequency, the initial data collected by the gyroscope sensor and the gravitational acceleration sensor so as to obtain the synchronous data. Finally, the racing game may use the synchronous data to calculate various parameters during the game.

Certainly, when the racing game quits running, registration of the gyroscope sensor and the gravitational acceleration sensor may be canceled by using the collecting unit registering module 303, and the operation mode setting module 302 may set the operation modes of the gyroscope sensor and the gravitational acceleration sensor as the originally default first operation mode from the second operation mode.

In conclusion, according to the data collecting apparatus provided in Embodiment 3, multiple groups of synchronous data of each data collecting unit are obtained in a manner of adjusting collection starting moments of at least two data collecting units and at the same time capturing, according to a synchronous collecting frequency, synchronous data from initial data collected by the at least two data collecting units; and each group of synchronous data is accurate data of each data collecting unit at a same moment, so that an application using the multiple groups of synchronous data can avoid occurrence of an error.

It should be noted that when the data collecting apparatus provided in the foregoing embodiment is described in Embodiment 3, only division of the foregoing functional modules is described as an example. In an actual application, the foregoing functions may be allocated to different functional modules for completing as required. That is, an inner structure of the apparatus is divided into different functional modules, so as to implement all or a part of the functions described in the foregoing. In addition, a data collecting terminal and the data collecting method that are provided in the foregoing embodiment belong to a same conception. For details of a specific implementation process, reference may be made to the method embodiment, and the details are not described herein again.

A person of ordinary skill in the art may understand that all or a part of the steps of the embodiments may be implemented by hardware or a program instructing relevant hardware. The program may be stored in a computer readable storage medium. The storage medium may include: a read-only memory, a magnetic disk, or an optical disc.

The foregoing descriptions are merely exemplary embodiments of the present invention, but are not intended to limit the present invention. Any modification, equivalent replacement, and improvement made without departing from the spirit and principle of the present invention shall fall within the protection scope of the present invention.

What is claimed is:

1. A data collecting apparatus applied in an apparatus comprising multiple data collecting units, wherein the data collecting apparatus comprises:
   a synchronous data collecting module at least partially implemented in hardware;
   an initialization duration acquiring module; and
   a starting moment acquiring module,
   wherein at least two data collecting units in the multiple data collecting units are configured to collect initial data simultaneously at their respective collecting frequencies and at a collection starting moment,
   wherein the synchronous data collecting module is configured to collect, at a synchronous collecting frequency, the initial data collected by the at least two data collecting units, so as to obtain synchronous data,
   wherein the synchronous collecting frequency is a common divisor frequency of the respective collecting frequencies of the at least two data collecting units,
   wherein the initialization duration acquiring module is configured to acquire initialization duration of the at least two data collecting units and the maximum initialization duration in the initialization duration,
   wherein the starting moment acquiring module is configured to acquire the collection starting moment, and
   wherein the collection starting moment is not smaller than a moment obtained by backwards prolonging a current moment by the maximum initialization duration.

2. The data collecting apparatus according to claim 1, wherein the data collecting apparatus further comprises an initialization moment acquiring module and an initialization module, wherein the initialization moment acquiring module is configured to acquire initialization moments of the at least two data collecting units, and the initialization moments of the at least two data collecting units are moments obtained after respective initialization duration of the data collecting units is advanced based on the collection starting moment, wherein the initialization module is configured to initialize the at least two data collecting units at the initialization moments, and wherein the at least two data collecting units are further configured to collect initial data at their respective collecting frequencies after initialization processes are simultaneously completed at the collection starting moment.

3. A data collecting apparatus, applied in an apparatus comprising multiple data collecting units, wherein the data collecting apparatus comprises:
   a synchronous data collecting module at least partially implemented in hardware;
   a collecting frequency acquiring module,
   a common divisor acquiring module, and
   a synchronous collecting frequency selecting module,
   wherein at least two data collecting units in the multiple data collecting units are configured to collect initial data simultaneously at their respective collecting frequencies and at a collection starting moment,
   wherein the synchronous data collecting module is configured to collect, at a synchronous collecting frequency, the initial data collected by the at least two data collecting units, so as to obtain synchronous data,
   wherein the synchronous collecting frequency is a common divisor frequency of the respective collecting frequencies of the at least two data collecting units,
   wherein the collecting frequency acquiring module is configured to acquire the collecting frequencies of the at least two data collecting units,
   wherein the common divisor acquiring module is configured to acquire all common divisors of values of the collecting frequencies of the at least two data collecting units, and
   wherein the synchronous collecting frequency selecting module is configured to select one from all the common divisors as a value of the synchronous collecting frequency.

4. The data collecting apparatus according to claim 3, wherein the synchronous collecting frequency selecting module comprises a demanded frequency acquiring unit and a synchronous collecting frequency determining unit, wherein the demanded frequency acquiring unit is configured to acquire a demanded frequency of synchronous data, wherein the demanded frequency is a frequency required when a synchronous data using module uses the synchronous data, and wherein the synchronous collecting frequency determining unit is configured to use the minimum common divisor of a common divisor that is in the common divisors and is not smaller than a value of the demanded frequency as the value of the synchronous collecting frequency.

5. The data collecting apparatus according to claim 4, wherein the demanded frequency acquiring unit comprises a lowest frequency acquiring subunit and a demanded frequency selecting subunit, wherein the lowest frequency acquiring subunit is configured to acquire lowest frequencies required when synchronous data using modules use the synchronous data, and wherein the demanded frequency selecting subunit is configured to select the least common multiple of values of all the lowest frequencies as the value of the demanded frequency.

6. A mobile terminal, comprising:
   multiple data collecting units, wherein at least two data collecting units in the multiple data collecting units are configured to collect initial data simultaneously at their respective collecting frequencies and at a collection starting moment; and
   a data collecting apparatus, wherein the data collecting apparatus comprises a synchronous data collecting module, wherein the synchronous data collecting module is configured to collect, at a synchronous collecting frequency, the initial data collected by the at least two data collecting units, so as to obtain synchronous data,
   wherein the synchronous collecting frequency is a common divisor frequency of the respective collecting frequencies of the at least two data collecting units,
   wherein the synchronous data permits an application operating on the mobile terminal to avoid an occurrence of an error, and
   wherein the data collecting apparatus further comprises a collecting unit registering module configured to register all or a part of the multiple data collecting units as the at least two data collecting units required when a synchronous data using module uses the synchronous data.

7. The mobile terminal according to claim 6, wherein the data collecting apparatus further comprises an initialization duration acquiring module and a starting moment acquiring module, wherein the initialization duration acquiring module is configured to acquire initialization duration of the at least two data collecting units and the maximum initialization duration in the initialization duration, and wherein the starting moment acquiring module is configured to acquire the collection starting moment, wherein the collection starting moment is not smaller than a moment obtained after the maximum initialization duration is prolonged backwards based on a current moment.

8. The mobile terminal according to claim 7, wherein the data collecting apparatus further comprises a collecting frequency acquiring module, a common divisor acquiring module, and a synchronous collecting frequency selecting module, wherein the collecting frequency acquiring module is configured to acquire the collecting frequencies of the at least two data collecting units, wherein the common divisor acquiring module is configured to acquire all common divisors of values of the collecting frequencies of the at least two data collecting units, and wherein the synchronous collecting frequency selecting module is configured to select one from all the common divisors as a value of the synchronous collecting frequency.

9. A mobile terminal, comprising:
   multiple data collecting units, wherein at least two data collecting units in the multiple data collecting units are configured to collect initial data simultaneously at their respective collecting frequencies and at a collection starting moment; and
   one or more processors configured to collect, at a synchronous collecting frequency, the initial data collected by the at least two data collecting units, so as to obtain synchronous data,
   wherein the synchronous collecting frequency is a common divisor frequency of the respective collecting frequencies of the at least two data collecting units,
   wherein the one or more processors are configured to register all or a part of the multiple data collecting units as the at least two data collecting units required when a synchronous data using module uses the synchronous data, and
   wherein the synchronous data permits an application operating on the mobile terminal to avoid an occurrence of an error.

* * * * *